United States Patent

Matumoto et al.

[11] Patent Number: 4,845,235
[45] Date of Patent: Jul. 4, 1989

[54] PYRROLINE DERIVATIVE

[75] Inventors: Hiroyuki Matumoto, Yono; Hidenori Imai, Urawa; Shozi Tada, Kasukabe, all of Japan

[73] Assignee: Nippon Kayaku Kabushiki Kaisha, Tokyo, Japan

[21] Appl. No.: 49,967

[22] Filed: May 15, 1987

[30] Foreign Application Priority Data

May 21, 1986 [JP] Japan ................................. 61-114682

[51] Int. Cl.⁴ .......................................... C07D 207/38
[52] U.S. Cl. ...................................................... 548/550
[58] Field of Search .......................................... 548/550

[56] References Cited

U.S. PATENT DOCUMENTS 3,013,013  12/1961  Carboni ............................. 260/240

Primary Examiner—David B. Springer
Attorney, Agent, or Firm—Henry C. Nields

[57] ABSTRACT

A pyrroline derivative represented by the formula:

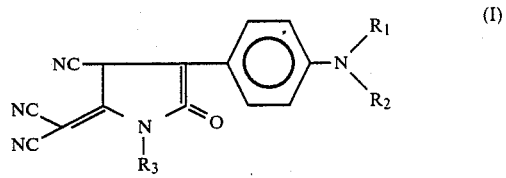

wherein $R_1$ and $R_2$ each independently stand for an alkyl ($C_{1-6}$), allyl, alkoxy ($C_{1-6}$) ethyl, allyloxyethyl, phenoxyethyl, phenylalkyl ($C_{1-3}$), alkoxy ($C_{1-6}$) carbonylalkyl ($C_{1-3}$) or phenoxyethoxycarbonylalkyl ($C_{2-3}$) group and $R_3$ stands for a hydrogen atom or $R_3'$, wherein $R_3'$ stands for an alkyl ($C_{1-6}$), allyl, benzyl, chlorobenzyl, nitrobenzyl, phenethyl, alkoxy ($C_{1-6}$) carbonylalkyl ($C_{1-3}$), phenoxyethoxycarbonylalkyl ($C_{2-3}$) or cyanoalkyl ($C_{1-2}$) group, a process for producing a pyrroline derivative represented by the formula (I) and methods for dyeing a hydrophobic fiber and coloring a synthetic resin with the same.

8 Claims, No Drawings

PYRROLINE DERIVATIVE

DETAILED DESCRIPTION OF THE INVENTION

The present invention relates to a pyrroline derivative, a preparation process of the same and a process for dyeing fibers or coloring resins with the same.

Up to this time, monoazo disperse dyes, anthraquinone disperse dyes, naphthoquinone disperse dyes, phthalocyanine pigments, condensed polycyclic pigments and the like have been used to obtain hydrophobic fibers or synthetic resins deeply colored blue or blue green by dyeing or pigmenting. However, only few dyes and pigments among them can satisfy various requirements such as tinting power for resin, affinity for fiber, compatibility with the resin or resistance of the dyed or pigmented product to light, humidity or solvent.

Under the above circumstances, it has been expected to develop a new coloring material (a dyestuff or pigment) which exhibits a high color-value and is excellent in brightness, affinity for fiber or resin and fastness to light, humidity and the like.

The inventors of the present invention have investigated to develop a coloring material which is excellent in brilliance and has a high color-value for fiber or resin and high fastness and have accomplished the present invention. The present invention relates to a pyrroline derivative represented by the formula:

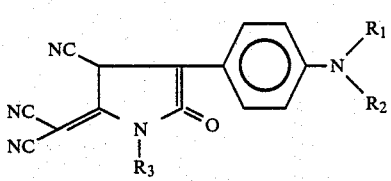
(I)

wherein $R_1$ and $R_2$ each independently stands for an alkyl ($C_{1-6}$), allyl, alkoxy ($C_{1-6}$) ethyl, allyloxyethyl, phenoxyethyl, phenylalkyl ($C_{1-3}$), alkoxy ($C_{1-6}$) carbonylalkyl ($C_{1-3}$) or phenoxyethoxycarbonylalkyl ($C_{2-3}$) group and $R_3$ stands for a hydrogen atom or $R_3'$, wherein $R_3'$ stands for an alkyl ($C_{1-6}$), allyl, benzyl, chlorobenzyl, nitrobenzyl, phenethyl, alkoxy ($C_{1-6}$) carbonylalkyl ($C_{1-3}$), phenoxyethoxycarbonylalkyl ($C_{2-3}$) or cyanoalkyl ($C_{1-2}$) group, and a process for dyeing a hydrophobic fiber or coloring a synthetic resin with this derivative. Further, the present invention provides a process for the preparation of a pyrroline derivative represented by the formula (I), which comprises chlorinating a compound represented by the formula:

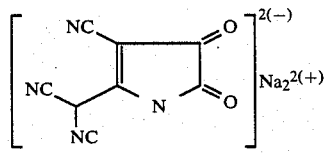
(IV)

to obtain a compound represented by the formula:

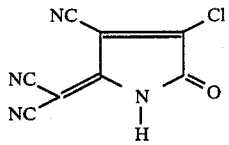
(V)

and condensing the compound (V) with a compound represented by the formula:

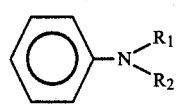
(VI)

(wherein $R_1$ and $R_2$ are as defined above) to obtain a compound represented by the formula:

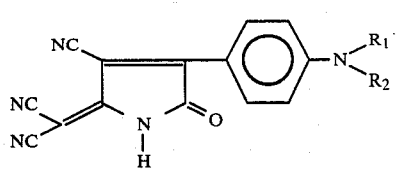
(II)

(wherein $R_1$ and $R_2$ are as defined above) and, if necessary, condensing the compound (II) with a compound represented by the formula:

$$R_3'-X \quad (III')$$

(wherein $R_3'$ is as defined above and X stands for Cl, Br or I) in the presence of a base.

Thus, a pyrroline derivative (I) of the present invention can be prepared according to the following scheme:

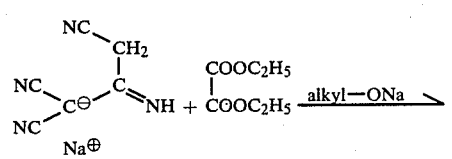

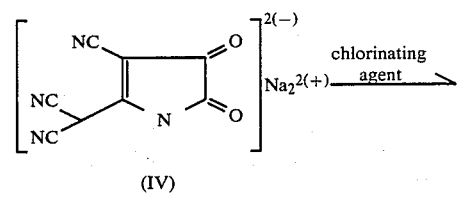

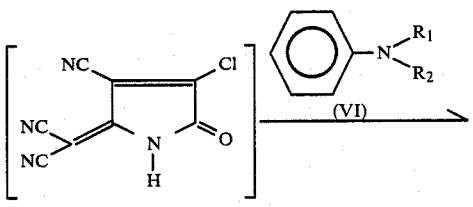

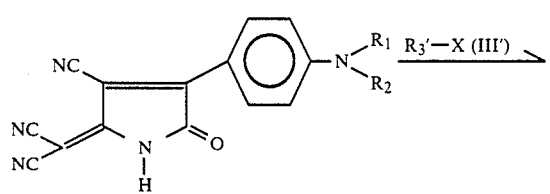

(II)

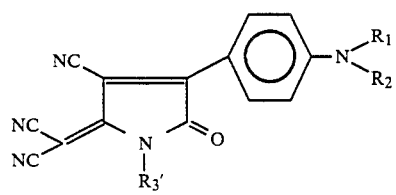

(I)

Namely, sodium salt of 1,1,3-tricyano-2-imino-propane (malononitrile dimer) is condensed with diethyl oxalate in the presence of sodium alcoholate in an alcohol to obtain a compound (IV). This compound (IV) is chlorinated with a chlorinating agent in an organic solvent to obtain a compound (V). This compound (V) is isolated and reacted with a compound (VI) to obtain a compound (II). Alternatively, the obtained compound (V) may be directly reacted with a compound (VI) without isolating the compound (V) to obtain a compound (II). The obtained compound (II) may be reacted with a compound (III') to obtain a compound (I).

Examples of the compound (VI) include N,N-dimethylaniline, N,N-diethylaniline, N,N-dipropylaniline, N,N-dibutylaniline, N,N-dipentylaniline, N,N-dihexylaniline, N,N-diallylaniline, N,N-di(methoxyethyl)aniline, N,N-di-(ethoxyethyl)aniline, N,N-di(butoxyethyl)aniline, N,N-di-(hexyloxyethyl)aniline, N,N-di(allyloxyethyl)aniline, N-ethyl-N-benzylaniline, N-ethyl-N-phenethylaniline, N-methyl-N-(3-phenylpropyl)aniline, N-ethyl-N-(3-phenylpropyl)aniline, N-butyl-N-(3-phenylpropyl)aniline, N,N-di(phenoxyethyl)aniline, N,N-di(methoxycarbonylmethyl)aniline, N,N-di(ethoxycarbonylmethyl)aniline, N,N-di(butoxycarbonylmethyl)aniline, N,N-di-(methoxycarbonylethyl)aniline, N,N-di(ethoxycarbonylethyl)-aniline, N,N-di(methoxycarbonylpropyl)aniline, N,N-di(ethoxy-carbonylpropyl)aniline, N,N-di(phenoxyethoxycarbonylpropyl)-aniline and N,N-di(phenoxyethoxycarbonylethyl)aniline. Examples of the chlorinating agent include phosphorus oxychloride, thionyl chloride and phosgene. Examples of the organic solvent to be used in the chlorination include N,N-dimethylformamide, dimethyl sulfoxide, N-methylpyrrolidone, acetonitrile, sulfolane and tetrahydrofuran. The chlorination of the compound (IV) easily proceeds at a temperature of −10° to +50° C., preferably 0° to 10° C. to give its chloride (V). This reaction product (V) an be isolated by pouring the reaction mixture into ice-water and neutralizing it with an alkali agent. However, the reaction product (V) can be also directly (without isolation) reacted with the compound (VI) at a temperature of −10° to +50° C., preferably 0° to 10° C. for 0.5 to 5 hours, preferably 2 to 3 hours to obtain the compound (II). The organic solvent to be used in the direct reaction without isolation is preferably N,N-dimethylformamide. The compound (II) is reacted with the compound (III') in the presence of a base in an organic solvent such as N,N-dimethylformamide, dimethyl sulfoxide, N-methylpyrrolidone or sulfolane at a temperature of 30° to 120° C., preferably 50° to 100° C. for 0.5 to 10 hours, preferably 1 to 3 hours to obtain the compound (I). Examples of the base include sodium carbonate, potassium carbonate, sodium hydrogen carbonate, magnesium oxide and pyridine. Examples of the compound (III') include methyl iodide, ethyl bromide, butyl bromide, hexyl bromide, allyl bromide, benzyl chloride, chlorobenzyl chloride, nitrobenzyl chloride, phenethyl chloride, methoxycarbonylmethyl chloride, ethoxycarbonylmethyl bromide, 3-(methoxycarbonyl)propyl bromide, 3-(ethoxycarbonyl)propyl bromide, 3-(phenoxyethoxycarbonyl)propyl bromide, 2-(phenoxyethoxycarbonyl)ethyl bromide, 2-cyanoethyl bromide and cyanomethyl bromide.

The condensation between sodium salt of 1,1,3-tricyano-2-imino-propane (malononitrile dimer) and diethyl oxalate easily proceeds in the presence of a metal alcoholate such as sodium ethoxide, potassium butoxide or sodium methoxide in an alcoholic solvent such as ethyl alcohol, isopropyl alcohol, propanol and butanol at room temperature (20° to 30° C.) under stirring for 1 to 8 hours preferably 2 to 3 hours to obtain the compound (IV).

A pyrroline derivative represented by the formula (I) is also obtained by the following process.

Namely, a compound represented by the formula (IV) is condensed with a compound represented by the formula (III) to obtain a compound represented by the formula (VII).

R₃—X                      (III)

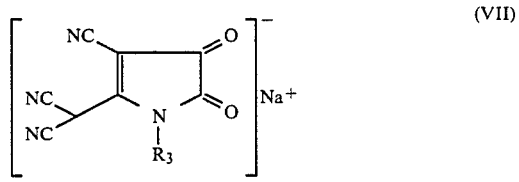

(VII)

This compound (VII) is chlorinated with an above-mentioned chlorinating agent in an organic solvent to obtain a compound represented by the formula (VIII).

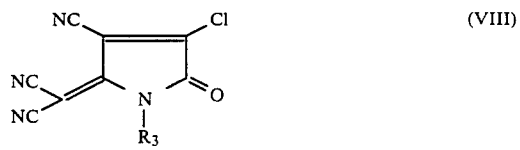

(VIII)

Then, the compound (VIII) is reacted with a compound (VI) to obtain the compound (I). In this process, the compounds (VII) and (VIII) may be usually isolated from reaction mixtures, but, if desired, a method wherein the compounds (VII) and (VIII) are not isolated from reaction mixtures may be applied. And in such a case that the compounds (VII) and (VIII) are not isolated from the reaction mixture, N,N-dimethylformamide is preferably used as a reaction solvent.

Examples of the organic solvent to be used in the reaction to obtain a compound (VII) include N,N-dimethylformamide, dimethylsulfoxide and N-methylpyrrolidone, and the reaction may be carried out at a temperature of 30° to 150° C., preferably 50° to 100° C. for 1 to 10 hours, preferably 3 to 5 hours. The chlorination of the compound (VII) easily proceeds at a temperature of −10° to 50° C., preferably 0° to 10° C. for a reaction time of 0.5 to 8 hours, preferably 2 to 3 hours. The reaction to obtain the compound (I) from compounds (VIII) and (VI) proceeds at a temperature of −10° to 50° C. preferably 0° to 10° C. for a reaction time of 0.5 to 10 hours preferably 1 to 3 hours. The pyrroline derivative (I) thus prepared is a novel compound having brilliant blue or blue green shade and is suitable for dyeing, printing, alkali discharge or reserve printing of a hydrophobic fiber such as polyester fiber, triacetate fiber or polyamide fiber. In these uses, the pyrroline derivative (I) can be used either alone or as a mixture thereof. The dyeing process using the pyrroline derivative (I) will now be described.

The pyrroline derivative (I) is advantageously used in finely divided form (a pulverised or fine-particlized dye) for dyeing. Namely, the pyrroline derivative (I) is fine-particlized (pulverised) with a small amount of water in the presence of an anionic dispersant such as naphthalenesulfonic acid-formaline condensate or ligninsulfonic acid, a nonionic dispersant such as adduct of alkylamine with ethylene oxide or adduct of alkylphenol with ethylene oxide and, if necessary, other additives by an electrically-powered motor, a sand mill, etc. and used as a liquid or dry powder. The ratio of the pyrroline derivative (I) to an anionic or nonionic dispersant is usually 15 to 50:85 to 50 (the pyrroline derivative (I): an anionic or nonionic dispersant).

The dyeing using a fine-particlized pyrroline derivative (dye) is carried out according to the following known processes.

(1) High-Temperature Dyeing

The dyeing is carried out in an aqueous medium under elevated pressure at 120° to 140° C.

(2) Carrier Dyeing

The dyeing is carried out in the presence of an auxiliary such as methylnaphthalene or monochlorobenzene in an aqueous medium at 100° C.

(3) Thermosol Dyeing

A cloth is subjected to padding with a liquid (padding liquid) containing a fine-particlized dye, semi-drying and treatment with dry-heat.

(4) Printing

A printing paste comprising a fine-particlized dye and other ingredients is applied to a cloth, followed by HT (high-temperature) steaming or HP (high-pressure) steaming.

(5) Alkali Discharge

A discharging agent containing sodium carbonate, potassium carbonate or the like is patternwise applied to cloth dyed by the above process (1) or (2), followed by HT steaming or HP steaming.

(6) Alkali Resist Printing

A paste containing a resisting agent such as sodium carbonat or potassium carbonate is patternwise applied on cloth and a printing paste is applied on the resulting cloth followed by HT steaming or HP steaming.

Alternatively, Tetron polyester fiber cloth is immersed in a padding liquid containing a fine-particlized dye and semi-dried, then a resisting paste is patternwise applied on the resulting cloth, followed by HT steaming or HP steaming. These processes are representative examples of the dyeing process to be applied in the present invention, though the pertinent process is not limited to them.

The dyed product obtained according to the present invention is brilliant blue or blue green and is excellent in fastness to light and sublimation, after-treatment and alkali dischargability and resist-printability.

The pyrroline derivative (I) is suitable for coloring various synthetic resins such as polystyrene, polyolefin, polyacrylate, polyamide, acrylonitrile-styrene copolymers or acrylonitrile-butadiene-styrene copolymers. The coloring of such a resin is carried out by adding a required amount of the pyrroline derivative (I) to a resin, kneading the resulting mixture under heating and molding the kneaded mixture at a suitable temperature which varies depending upon the melting point of the resin by compression molding, injection molding, calendering or the like. The pyrroline derivative (I) has a high tinting power and gives a brilliant blue or blue green dyed product excellent in fastness, particularly to light.

EXAMPLES

The present invention will be described by the following Examples in more detail, wherein all parts and percentages are by weight.

EXAMPLE 1

11.3 parts of sodium methoxide were dissolved in 250 parts of ethyl alcohol to obtain a solution. 30.8 parts of sodium salt of 1,1,3-tricyano-2-imino-propane were added to this solution, followed by the addition of 35.0 parts of diethyl oxalate. The obtained mixture was stirred at 20° to 30° C. for 4 hours to complete the reaction. The formed yellow crystalline precipitate was filtered, washed with ethyl alcohol and dried to obtain 40.0 parts of a compound represented by the formula:

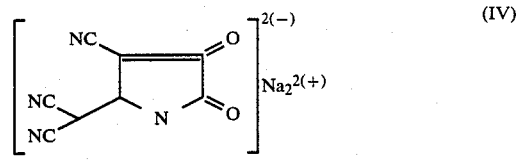

as a yellow crystal.

9.2 parts of the compound (IV) were dissolved in 40.0 parts of N,N-dimethylformamide to obtain a solution. 18.4 parts of phosphorus oxychloride were dropwise added to this solution over a period of one hour, while cooling the solution with ice at 0° to 5° C. The mixture was kept at 0° to 5° C. for 3 hours to complete the reaction. A reaction mixture containing a compound represented by the formula:

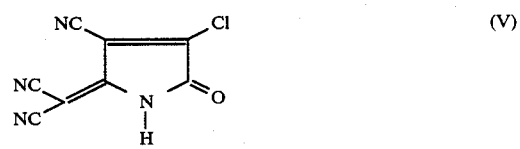

was obtained. A solution of 8.2 parts of N,N-dibutylaniline in 20 parts of N,N-dimethylformamide was dropwise added to this reaction mixture over a period of 30 minutes, while keeping the mixture at 0° to 5° C. The obtained mixture was kept at 0° to 5° C. for 3 hours under stirring to obtain a blue green reaction mixture. 40 parts of water were dropwise added to this reaction mixture over a period of one hour at 0° to 10° C. The obtained mixture was stirred at 5° to 10° C. for one hour to precipitate a blue crystal. This crystal was filtered, washed with water and hot water successively and dried to obtain 7.7 parts of a pyrroline derivative represented by the formula:

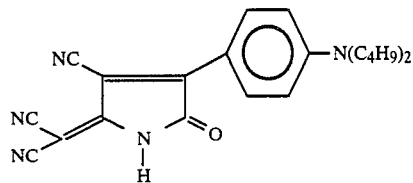

(IX)

λmax 602 nm (in acetone)

EXAMPLE 2

3.7 parts of the compound (IX) prepared in Example 1 were dissolved in 20 parts of N,N-dimethylformamide, followed by the addition of 1.6 parts of potassium carbonate. The obtained mixture was heated to a temperature of 70° to 75° C. 2.4 parts of alkyl bromide were dropwise added to the mixture over a period of 30 minutes at this temperature. The obtained mixture was kept at the same temperature for one hour to complete the reaction.

60 parts of methanol were dropwise added to the reaction mixture over a period of 30 minutes under cooling with ice at 0° to 5° C. The obtained mixture was stirred at 0° to 5° C. for one hour to obtain a green crystalline precipitate. This precipitate was filtered, washed with 50 parts of methanol and water successively and dried to obtain 2.7 parts of a compound represented by the formula:

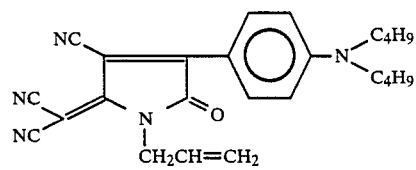

(X)

λmax 638 nm (in acetone)

as a green crystal.

EXAMPLE 3

The same reaction as the one described in Example 1 was repeated except that 10.7 parts of N-butyl-N-(3-phenylpropyl)aniline wer used instead of N,N-dibutylaniline. After the reaction, 20 parts of water were dropwise added to the obtained reaction mixture at 0° to 5° C. over a period of one hour, followed by the dropwise addition of 60 parts of methanol over a period of 30 minutes. The mixture was stirred at 10° to 20° C. for one hour to obtain a crystalline precipitate. This precipitate was filtered, washed with 100 parts of methanol, water and hot water successively and dried to obtain 8.0 parts of a compound represented by the formula:

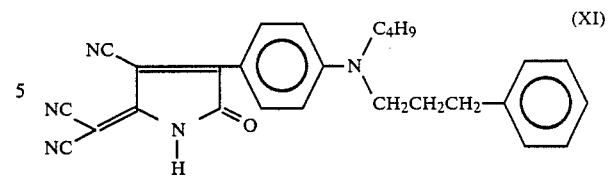

(XI)

λmax 602 nm (in acetone)

as a blue crystal.

EXAMPLE 4

The same reaction as the one described in Example 2 was carried out except that 2.7 parts of butyl bromide were used instead of allyl bromide and that the reaction was carried out at 90° to 100° C. for 5 hours. 80 parts of methanol was dropwise added to the reaction mixture, while cooling the mixture with ice at 0° to 5° C. The obtained mixture was stirred for one hour, filtered, washed with 80 parts of methanol and water successively and dried to obtain 1.7 parts of a compound represented by the formula:

(XII)

λmax 636 nm (in acetone)

as a green crystal.

EXAMPLE 5

The same procedure as that decribed in Example 1 was repeated except that 11.9 parts of N,N-di(3-ethoxycarbonylpropyl)aniline were used instead of N,N-dibutylaniline to obtain 7.8 parts of a compound represented by the formula:

(XIII)

λmax 583 nm (in acetone)

as a blue green crystal.

EXAMPLE 6

1.9 parts of the compound (IX) prepared in Example 1 were dissolved in 10.0 parts of N,N-dimethylformamide, followed by the addition of 0.8 part of potassium carbonate. 2.0 parts of 3-(ethoxycarbonyl)propyl bromide were dropwise added to the obtained mixture for a period of 30 minutes at 90° to 95° C. The resulting mixture was kept at this temperature for 2 hours to complete the reaction. 30 parts of methanol were added to the reaction mixture, while cooling the mixture with ice at 0° to 5° C. The obtained mixture was stirred for one hour, filtered and washed with 40 parts of methanol and water successively to obtain 1.2 parts of a compound represented by the formula:

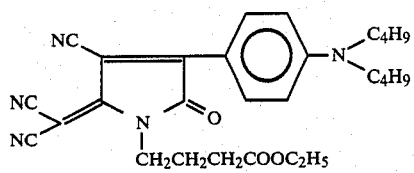

λmax 638 nm (in acetone)

as a blue green crystal.

EXAMPLE 7

34.5 parts of the compound (IV) prepared in Example 1 were dissolved in 150 parts of N,N-dimethylformamide to obtain a solution, and 36.3 parts of allyl bromide were dropwise added to the solution at 90° to 95° C. over a period of one hour. And the solution thus obtained was stirred at 90° to 95° C. for 4 hours to obtain a reaction mixture containing a compound represented by the formula (XV).

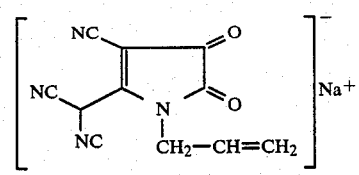

71.4 parts of thionyl chloride were dropwise added to the reaction mixture at 0° to 5° C. over a period of one hour to obtain a solution. The solution thus obtained was stirred at 0° to 5° C. for 2 hours to obtain a reaction mixture containing a compound represented by the formula (XVI).

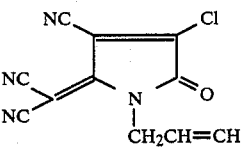

A solution consisting of 36.1 parts of N-butyl-N-(3-phenylpropyl)aniline and 30 parts of N,N-dimethylformamide was dropwise added to the reaction mixture to obtain a mixture, which is stirred at 0° to 5° C. for 3 hours to obtain a reaction mixture. 375 parts of a solution (methanol:water=9:1) were added to the reaction mixture at below 15° C. over a period of 2 hours to obtain a mixture, which was stirred at 0° to 5° C. for one hour to obtain a crystalline precipitate. This precipitate was filtered, washed with 300 parts of methanol, water and hot water successively and dried to obtain 35 parts of a compound represented by the formula (XVII).

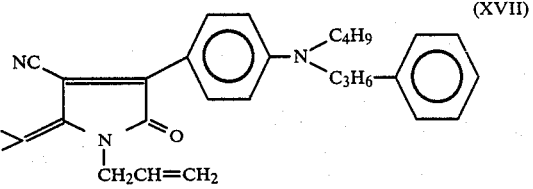

λmax 638 nm (in acetone)

EXAMPLES 8 TO 69

The following compounds were prepared in a similar manner to that described in Examples 1 to 7 and the dyeing of polyester fiber with these compounds was carried out in a similar manner to that which will be described in Example 70 to obtain brilliant blue or blue green polyester fibers.

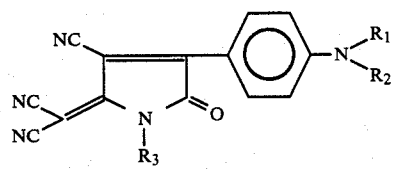

| Ex. No. | $R_1$ | $R_2$ | $R_3$ | λmax(nm) (in acetone) |
|---|---|---|---|---|
| 8 | —$C_4H_9$ | —$C_4H_9$ | —$CH_2$—⬡ | 643 |
| 9 | " | —$C_4H_9$ | —$CH_2COOCH_3$ | 648 |
| 10 | —$C_6H_{13}$ | —$C_6H_{13}$ | —H | 603 |
| 11 | " | " | —$CH_2CH=CH_2$ | 640 |
| 12 | —$CH_2CH_2CH_2COOC_2H_5$ | —$CH_2CH_2CH_2COOC_2H_5$ | " | 628 |
| 13 | —$C_2H_5$ | —$CH_2CH_2$—⬡ | —H | 602 |
| 14 | " | " | —$CH_2CH=CH_2$ | 638 |

-continued

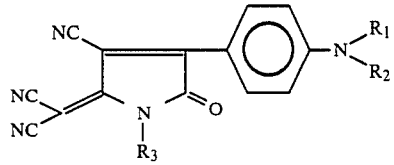
(I)

| Ex. No. | R₁ | R₂ | R₃ | λmax(nm) (in acetone) |
|---|---|---|---|---|
| 15 | —C$_2$H$_5$ | —CH$_2$CH$_2$CH$_2$—C$_6$H$_5$ | —H | 603 |
| 16 | " | " | —CH$_2$CH=CH$_2$ | 638 |
| 17 | —C$_2$H$_5$ | —C$_2$H$_5$ | —C$_2$H$_5$ | 636 |
| 18 | —CH$_3$ | —CH$_2$CH$_2$CH$_2$—C$_6$H$_5$ | —H | 602 |
| 19 | " | " | —CH$_2$CH=CH$_2$ | 636 |
| 20 | —CH$_2$CH=CH$_2$ | —CH$_2$CH=CH$_2$ | —H | 600 |
| 21 | —CH$_2$CH=CH$_2$ | —CH$_2$CH=CH$_2$ | —CH$_2$CH=CH$_2$ | 630 |
| 22 | —C$_2$H$_4$OCH$_3$ | —C$_2$H$_4$OCH$_3$ | " | 634 |
| 23 | —C$_2$H$_4$OC$_2$H$_5$ | —C$_2$H$_4$OC$_2$H$_5$ | " | 634 |
| 24 | —C$_2$H$_4$OC$_4$H$_9$ | —C$_2$H$_4$OC$_4$H$_9$ | —H | 601 |
| 25 | " | " | —CH$_2$CH=CH$_2$ | 634 |
| 26 | —C$_2$H$_4$OC$_6$H$_{13}$ | —C$_2$H$_4$OC$_6$H$_{13}$ | —H | 601 |
| 27 | " | " | —CH$_2$CH=CH$_2$ | 634 |
| 28 | —C$_2$H$_4$OCH$_2$CH=CH$_2$ | —C$_2$H$_4$OCH$_2$CH=CH$_2$ | —H | 601 |
| 29 | —C$_2$H$_4$OCH$_2$CH=CH$_2$ | —C$_2$H$_4$OCH$_2$CH=CH$_2$ | —CH$_2$CH=CH$_2$ | 634 |
| 30 | —C$_2$H$_4$O—C$_6$H$_5$ | —C$_2$H$_4$O—C$_6$H$_5$ | —H | 601 |
| 31 | " | " | —CH$_2$CH=CH$_2$ | 634 |
| 32 | —CH$_2$COOC$_2$H$_5$ | —CH$_2$COOC$_2$H$_5$ | " | 590 |
| 33 | —C$_3$H$_6$COOC$_2$H$_4$O—C$_6$H$_5$ | —C$_3$H$_6$COOC$_2$H$_4$O—C$_6$H$_5$ | —H | 583 |
| 34 | " | " | —CH$_2$CH=CH$_2$ | 628 |
| 35 | —C$_2$H$_5$ | " | —H | 595 |
| 36 | " | " | —CH$_2$CH=CH$_2$ | 630 |
| 37 | —C$_4$H$_9$ | —C$_3$H$_6$COOC$_2$H$_4$O—C$_6$H$_5$ | —H | 595 |
| 38 | " | —C$_3$H$_6$—C$_6$H$_5$ | —C$_4$H$_9$ | 638 |
| 39 | —C$_2$H$_5$ | —C$_2$H$_4$COOC$_2$H$_4$O—C$_6$H$_5$ | —H | 590 |
| 40 | —C$_4$H$_9$ | —C$_2$H$_4$COOC$_2$H$_4$O—C$_6$H$_5$ | —CH$_2$CH=CH$_2$ | 625 |

-continued

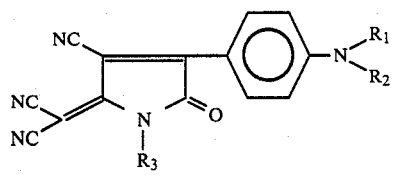
(I)

| Ex. No. | R₁ | R₂ | R₃ | λmax(nm) (in acetone) |
|---|---|---|---|---|
| 41 | " | —C₄H₉ | —CH₃ | 638 |
| 42 | " | " | —CH₂—C₆H₄—Cl (para) | 643 |
| 43 | " | " | —CH₂—C₆H₄—Cl (ortho) | 643 |
| 44 | —C₄H₉ | —C₄H₉ | —CH₂—C₆H₄—NO₂ | 643 |
| 45 | " | " | —C₂H₄—C₆H₅ | 638 |
| 46 | " | " | —CH₂COOCH₃ | 648 |
| 47 | " | " | —CH₂COOC₄H₉ | 648 |
| 48 | —C₄H₉ | —C₄H₉ | —C₃H₆COOC₆H₁₃ | 638 |
| 49 | " | " | —C₃H₆COOC₂H₄O—C₆H₅ | 638 |
| 50 | " | " | —C₂H₄COOC₂H₄O—C₆H₅ | 638 |
| 51 | —C₄H₉ | —C₄H₉ | —C₂H₄CN | 638 |
| 52 | —C₄H₉ | —C₄H₉ | —CH₂CN | 640 |
| 53 | —C₂H₅ | —CH₂—C₆H₅ | —CH₂—CH=CH₂ | 605 |
| 54 | —C₃H₆COOCH₃ | —C₃H₆COOCH₃ | —H | 583 |
| 55 | " | " | —CH₂—CH=CH₂ | 628 |
| 56 | —C₃H₆COOC₆H₁₃ | —C₃H₆COOC₆H₁₃ | —H | 583 |
| 57 | " | " | —CH₂—CH=CH₂ | 628 |
| 58 | —C₄H₉ | —C₄H₉ | —C₆H₁₃ | 638 |
| 59 | " | " | —CH₃ | 636 |
| 60 | —CH₃ | —C₃H₆—C₆H₅ | " | 636 |
| 61 | —C₂H₅ | " | " | 636 |

-continued

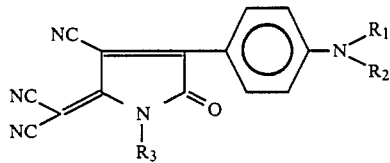
(I)

| Ex. No. | R₁ | R₂ | R₃ | λmax(nm) (in acetone) |
|---|---|---|---|---|
| 62 | —C$_4$H$_9$ | —C$_3$H$_6$—C$_6$H$_5$ | —CH$_3$ | 636 |
| 63 | —C$_2$H$_5$ | —C$_2$H$_5$ | " | 636 |
| 64 | —CH$_3$ | —CH$_3$ | —H | 584 |
| 65 | —C$_2$H$_5$ | —C$_2$H$_5$ | —H | 584 |
| 66 | —C$_2$H$_4$OCH$_3$ | —C$_2$H$_4$OCH$_3$ | —H | 578 |
| 67 | —C$_2$H$_4$OC$_2$H$_5$ | —C$_2$H$_4$OC$_2$H$_5$ | —H | 578 |
| 68 | —CH$_2$CH$_2$CH$_2$—C$_6$H$_5$ | —CH$_2$CH$_2$CH$_2$—C$_6$H$_5$ | | |
| 69 | " | " | —CH$_2$—CH=CH$_2$ | 638 |

Note
The compound X—R$_3$' used in the preparation of a compound represented by the formula (I) is Cl—R$_3$' with respect to Examples 8, 42, 43, 44 and 52, I—R$_3$' with respect to Examples 41, 59, 60, 61, 62, 63 and 69, and Br—R$_3$' with respect to the other Examples.

EXAMPLE 70

3 parts of the compound (X) prepared in Example 2 was treated with 4 parts of Demol N (dispersant; a product of Kao-Atlas Co., Ltd.) and 3 parts of Demol C (do.) in a wet state in an electrically-powered mortar for 5 hours and dried to obtain a fine-particlized dye. 0.1 part of this fine-particlized dye was dispersed in 100 parts of water. Acetic acid was added to the obtained dispersion to adjust the pH to 5. 5 parts of a polyester cloth were immersed in the resulting dispersion at 130° C. for 60 minutes, taken out and washed with water. The resulting cloth was immersed in 100 parts of a solution of 2 parts of caustic soda, 2 parts of hydrosulfite and 1 part of Monogen (a detergent, a product of Dai-ichi Kogyo Seiyaku Co., Ltd.) in 1000 parts of water at 80° C. for 15 minutes, taken out, washed with water and dried to obtain a brilliant blue green cloth. The dyed cloth was excellent in fastness to light and sublimation and post-processability.

EXAMPLE 71

The compound (IX) prepared in Example 1 was treated in a similar manner to that described in Example 70 to obtain a fine-particlized dye.

| A color paste comprising | |
|---|---|
| the above fine-particlized dye | 3 parts |
| carboxymethylcellulose sizing agent (20%) | 60 parts |
| sodium chlorate | 0.5 part |
| tartaric acid | 0.2 part |
| level dyeing agent and | 2 parts |
| hot water | 34.3 parts | was prepared. A polyester cloth was patternwise printed with this color paste, dried at 80° C. and maintained in super-heated steam of 170° C. for 5 minutes. The resulting cloth was washed with water, subjected to reductive washing, washed with water and dried. Brilliant blue was developed in the printed area. The dyed cloth was excellent in fastness to light and sublimation and post-processability.

EXAMPLE 72

The compound (XI) prepared in Example 3 was treated in a similar manner to that described in Example 70 to obtain a fine-particlized dye. 20 g/l of this fine-particlized dye and 1 g/l of sodium alginate (migration inhibitor) were placed in a pad bath. A polyester-cotton mixed fabric was subjected to padding in this pad bath at room temperature and squeeze to a weight increase of 65%. The resulting fabric was semi-dried and dried at 200° C. for 90 seconds to carry out the fixing. The fabric was subjected to reductiv washing, washed with water and dried to obtain a brilliant blue dyed fabric. This dyed fabric was excellent in fastness to light and sublimation and after-treatment.

EXAMPLE 73

A Tetoron cloth was partially printed with an alkali resisting paste comprising

| sodium carbonate | 5 parts |
|---|---|
| glycerin | 10 parts |
| 20% paste of Fine Gum D-2515 (a glue, a product of Dai-ichi Kogyo Seiyaku Co., Ltd.) and | 55 parts |
| water | 30 parts | and semi-dried. Separately, the compound (XIII) prepared in Example 5 was treated in a similar manner to that described in Example 70 to obtain a fine-particlized dye. A color paste containing this fine-particlized dye was prepared in a similar manner to that described in Example 71 and applied on the whole area of the above cloth. The resulting cloth was semi-dried, subjected to steaming with saturated steam at 130° C. for 20 minutes, washed with water, subjected to reductive washing and dried.

A brilliant blue dyed cloth excellent in whiteness of the area printed with the alkali resisting paste was obtained.

EXAMPLE 74

The same procedure as that described in Example 70 was repeated except that the compound (XIII) prepared in Example 5 was used instead of the compound (X) to obtain a brilliant blue dyed cloth. This cloth was partially printed with an alkali discharging paste having the composition which will be described below, semi-dried and subjected to steaming at 180° C. for 8 minutes. The resulting cloth was washed with water and hot water successively, subjected to reductive washing and dried. A dyed cloth excellent in whiteness of the area printed with the alkali discharging paste was obtained.

| <Alkali discharging paste> | |
|---|---|
| sodium carbonate | 3 parts |
| sodium hydroxide | 2 parts |
| dicyandiamide | 2 parts |
| stock size comprising 20% of Fine Gum D-2514 (a glue, a product of Dai-ichi Kogyo Seiyaku Co., Ltd.) and water | 70 parts |
| Color Fine AD (an accelerator for discharge, a product of Dai-ichi Kogyo Seiyaku Co., Ltd.) | 10 parts |
| Dispaint PC (an accelerator for discharge, a product of Nikka Kagaku Co., Ltd.) | 5 parts |
| water | 8 parts |

EXAMPLE 75

The compound (XIV) prepared in Example 6 was treated in a similar manner to that described in Example 70 to obtain a fine-particlized dye. A Tetoron georgette cloth was immersed in a pad liquid comprising

| the above fine-particlized dye | 40 parts |
|---|---|
| Snow Algine SSL (an alginate, a product of Fuji Kagaku) | 1 part |
| citric acid | 2 parts |
| Succinol CS-K (a penetrant, a product of Nippon Senka) and | 0.5 part |
| water | 956.5 parts | and squeeze with a mangle to 80% and semi-dried at 80° C. for 3 minutes. The resulting cloth was partially printed with an alkali reserving paste having the composition which will be described below, semi-dried at 80° C. for 3 minutes and subjected to HT steaming at 175° C. for 7 minutes. The resulting cloth was washed with water and hot water successively, subjected to reductive washing, washed with water and dried. A brilliant blue green cloth excellent in whiteness of the area printed with the alkali reserving paste was obtained.

| <Alkali reserving paste> | |
|---|---|
| stock size comprising 20% of Fine Gum D-2514 (a product of Dai-ichi Kogyo Seiyaku Co., Ltd.) and water | 55 parts |
| sodium carbonate | 5 parts |
| Color Fine AD (a product of Dai-ichi Kogyo Seiyaku Co., Ltd.) | 10 parts |
| water | 30 parts |

EXAMPLE 76

200 parts of polystyrene pellet were mixed with 0.1 part of the compound (XII) prepared in Example 4 and 0.1 part of calcium stearate in a rotary mixer to obtain a mixture. This mixture was molded with an injection molding machine at 200° C. to obtain a brilliant blue green molded article excellent in fastnesses.

What we claim is:

1. A pyrroline derivative represented by the formula:

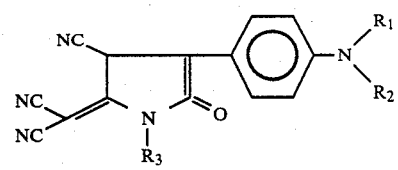

Wherein $R_1$ and $R_2$ each independently stand for an alkyl ($C_{2-6}$) or phenylalkyl ($C_{2-3}$) group and $R_3$ stands for a hydrogen atom, an alkyl ($C_{1-4}$), allyl, alkoxy ($C_{1-6}$) carbonylpropyl or benzyl group.

2. A pyrroline derivative, according to claim 1, wherein $R_3$ stands for an allyl group, $R_1$ and $R_2$ each independently stand for an alkyl ($C_{2-6}$), or phenylalkyl ($C_{2-3}$) group.

3. A pyrroline derivative, according to claim 2, wherein $R_3$ stands for an allyl group, $R_1$ and $R_2$ stand for a butyl group.

4. A pyrroline derivative, according to claim 2, wherein $R_3$ stands for an allyl group, $R_1$ stands for a butyl group and $R_2$ stands for

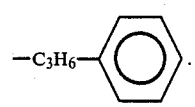

5. A pyrroline derivative, according to claim 2, wherein $R_3$ stands for an allyl group, $R_1$ and $R_2$ stand for

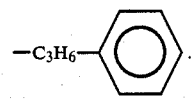

6. A pyrroline derivative, according to claim 1, wherein $R_3$ stands for a hydrogen atom, $R_1$ and $R_2$ each independently stand for an alkyl ($C_{2-4}$) or phenylalkyl ($C_{2-3}$) group.

7. A pyrroline derivative, according to claim 6, wherein $R_3$ stands for a hydrogen atom, $R_1$ stands for a butyl group and $R_2$ stands for
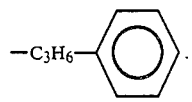
8. A pyrroline derivative, according to claim 6, wherein $R_3$ stands for a hydrogen atom, $R_1$ and $R_2$ stand for
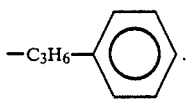
* * * * *